Sept. 22, 1964   G. B. KLINEFELTER   3,149,640
VENT VALVE WITH CENTRIFUGALLY ACTUATED
FLOW CONTROL MEANS IN OUTLET
Filed June 28, 1962
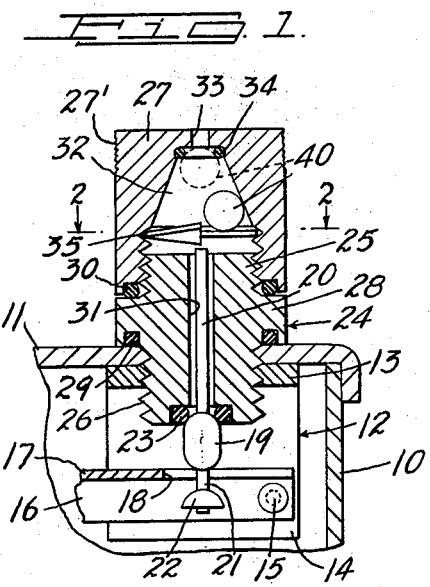
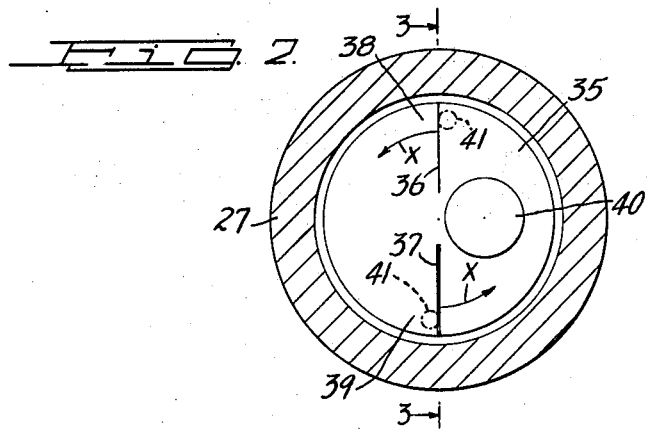
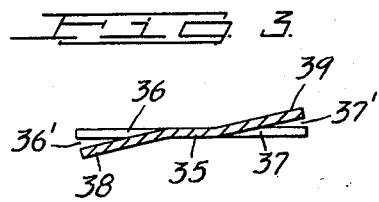
INVENTOR.
GLENN B. KLINEFELTER
BY
*Howard C. Thompson*
ATTORNEY

United States Patent Office 3,149,640
Patented Sept. 22, 1964

3,149,640
VENT VALVE WITH CENTRIFUGALLY ACTUATED FLOW CONTROL MEANS IN OUTLET
Glenn B. Klinefelter, Mountainside, N.J., assignor to Gorton Heating Corporation, Cranford, N.J., a corporation of New York
Filed June 28, 1962, Ser. No. 205,885
3 Claims. (Cl. 137—202)

This invention relates to valves employed for controlling the discharge of air, liquids or the like. More particularly, the invention deals with a valve of the character described used in connection with hot water or other fluid heating systems for the release of air in the system, while preventing discharge of water or fluid from the system. Still more particularly, the invention deals with a valve structure of the character defined employing in the discharge end portion thereof a flow control means, preferably in the form of a disc, outwardly of which the discharge chamber of the valve includes a spherical element centrifugally actuated in the chamber in the discharge of the medium employed and in further providing a check, closing the discharge from said chamber.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is an enlarged sectional view through an upper corner portion of the casing of a device showing one of my improved valves and illustrating, in part, the usual float actuating lever arm.

FIG. 2 is an enlarged section on the line 2—2 of FIG. 1 and diagrammatically illustrating the flow into the discharge chamber of the valve regulated by the control disc employed; and FIG. 3 is a partial section on the line 3—3 of FIG. 1 showing only the flow control disc of the valve, the section being somewhat irregular on the line 3—3.

In illustrating one adaptation and use of my invention, I have shown a valve arranged in a casing of a valve structure, generally similar to the valve structure disclosed in my Letters Patent No. 3,002,522, granted October 3, 1961. However, valves of the specific type and kind herein disclosed can be used in conjunction with other types and kinds of devices.

Considering FIG. 1 of the drawing, 10 represents a casing, having a cover 11 suitably fixed thereto. Supported on the inner surface of the cover is a bracket 12, one wall 13 of which is adjacent the surface of the cover 11; whereas, the angular wall 14 of the bracket includes a pivot, as at 15, for a lever arm 16 coupled with and actuated by the usual float of devices of the kind under consideration, as disclosed in the patent above identified. The pivoted end portion of the upper wall 17 of the arm 16 has an elongated slot 18, facilitating attachment and detachment of the valve element 19 of the device. The valve element includes an elongated stem 20, having a lower projecting portion 21 supporting a rounded head 22 which, in combination with the element 19, retains the valve element against displacement from the lever arm, the rounded head 22 facilitating positive displacement of 19 from its seated position on the O-ring 23 supported in the lower portion of the valve plug 24, as clearly shown.

The plug 24 has upper and lower externally threaded portions 25 and 26, the lower threaded portion operating in the cover 11 and the wall 13 of the bracket; whereas, a detachable cap 27 is internally threaded to engage the upper threaded portion 25. At 28 I have shown the central large diameter body portion of the plug 24 and this body portion is apertured to receive an O-ring 29 to form a seal of the plug on the cover 11, as diagrammatically shown, and the lower end of the cap is also recessed to support an O-ring 30 in forming a seal for the cap 27 on the body 18, again, as diagrammatically shown. The plug 24 has a central elongated bore 31, larger in diameter than the diameter of the stem 20 to form a clear passage through the plug when 19 is in unseated position to allow the escape of air from the casing 10 into a discharge chamber 32 of the cap. This chamber preferably has upwardly contracted walls, as clearly shown, and centrally of the upper end of the cap is a small discharge opening or port 33, inwardly of which the cap has a suitable retained O-ring 34.

Mounted in the threaded bore of the cap 27 is a thin flow control discharge 35, having oppositely arranged slits 36 and 37, note FIG. 2 of the drawing. Radial portions of the disc at one side of the slits 36 and 37, the left side as shown in FIG. 2 of the drawing, are flexed or offset downwardly, as seen at 38, and upwardly, as seen at 39, note particularly FIG. 3 of the drawing. These flexures form discharge openings, as at 36' and 37', FIG. 3, through which air, water or other liquid will pass in discharge through the valve device, generally in the direction of the arrows X, as noted in FIG. 2, to provide a whirling action in the chamber 32, giving to a centrifugally actuated means or member, such as a spherical member 40, a whirling action in the chamber 32, depending entirely upon the force or pressure of the air, gas or liquid discharged into the chamber in the direction of the arrows X. In the illustration herein given by way of showing one adaptation and use of my invention, the member 40 is a suitable buoyant spherical member formed of any suitable material. It will, thus, be apparent that, in the hot water system of the type and kind referred to, air discharged from the system through the slits or discharge openings 36, 37 of the discharge 35, when valve 19 is in opened position, will produce a vortical whirl to cause the member 40 to swirl in the chamber 32 and allow the air to escape through the discharge port 33. If, for any reason, water or other liquid is allowed to rise in the system and to enter the chamber 32, the buoyant member 40 will then be moved into its raised position, as indicated in dotted lines in FIG. 1 and seat on the ring 34, preventing discharge of the water or liquid through the port 33.

In mounting the disc 35 in position in the cap 27, a suitable spanner tool having spaced members, as indicated in dot-dash lines at 41 in FIG. 1, can be utilized to engage edges of the slit portions in rotating the disc in the internally threaded portion of the cap, until the disc is checked in the last thread at the base of the chamber 32 and, in this position, the disc 35 is spaced well above the top of the stem 20 so as to facilitate movement of 19 into seated position on the ring 23 at all times.

In some uses of valves of the kind under consideration, the member 40 can be of all metallic or weighted member and, in such uses, as and when fluid enters the chamber, the member 40 will not move into seated position, but rather will be acted upon by the centrifugal force of the fluid and whirled in the chamber and, in this function, actuate as an accelerator in control of the discharge of fluid through the port 33. In this connection, it will be apparent that, by virtue of the radial contour of the openings, as at 36', 37' in the disc 35, greater velocity will be located at the periphery of the largest diameter of the chamber 32 and, thus, act directly upon the member 40, while permitting the turbulent flow of liquid to extend to and be discharged from the port 33 in spray-like fashion. In FIG. 1, a roughened knurl-like surface 27' is indicated at the upper portion of the cap in facilitating manual attachment and detachment of the cap for cleaning or repair and the large diameter portion 28 of the plug 24 can be fashioned to facilitate detachment of the plug, as and when required and this can be done without displacement of the valve element 19.

Having fully described my invention, what I claim as new and desire to secure by Letters Patent is:

1. A valve device of the character defined comprising a plug having a large diameter central body and an externally threaded lower end for coupling with a suitable support, an internally threaded cap detachably coupled with an upper externally threaded end of the plug, said plug having a bore extending through upper and lower ends thereof, the cap having a discharge chamber beyond upper end limits of the plug, said chamber terminating in a discharge port at the upper end of the cap, a flow control disc mounted in the threads of the cap beyond said plug and forming the base of said discharge chamber, said disc having discharge openings at peripheral portions thereof placing the bore of said plug in communication with said discharge chamber, said discharge openings being constructed and arranged in such manner as to produce a vortical whirl of fluid passing therethrough from the bore toward the discharge port, a member mounted in the discharge chamber acted upon by the flow of a medium passed through said discharge openings, said member being constructed so as to be centrifugally actuated in said discharge chamber by said vortical flow, the lower portion of the bore of said plug having an O-ring valve seat, a valve element including a stem freely arranged in the bore of said plug, and the upper end of said stem being spaced with respect to said disc when the valve element is in seated position on said O-ring valve seat.

2. A valve device as defined in claim 1, wherein the support for said plug comprises a casing, a bracket supported and arranged in the casing, a lever arm in the casing and pivotally supported in connection with said bracket, and said valve element being mounted in connection with said lever arm and having a portion operatively engaging said O-ring valve seat.

3. A valve device as defined in claim 1, wherein the discharge port of said cap includes an O-ring seat, in connection with which said member operates in checking discharge of a medium through said port, and means is employed for providing seals between the cap and support and the large diameter body of said plug.

References Cited in the file of this patent

UNITED STATES PATENTS

| | | |
|---|---|---|
| 2,086,515 | Evans | July 6, 1937 |
| 2,633,142 | Woolley | Mar. 31, 1953 |
| 3,002,522 | Klinefelter | Oct. 3, 1961 |

FOREIGN PATENTS

| | | |
|---|---|---|
| 8,698 | Great Britain | of 1908 |
| 530,726 | France | Oct. 10, 1921 |
| 269,540 | Italy | Nov. 22, 1929 |